United States Patent [19]

Hubbard

[11] 4,129,876

[45] Dec. 12, 1978

[54] APPARATUS FOR MOUNTING A MARKER PEN TO A TUBULAR RECORDER PEN ARM

[75] Inventor: James R. Hubbard, Moorestown, N.J.

[73] Assignee: Graphic Controls Corporation, Cherry Hill, N.J.

[21] Appl. No.: 802,738

[22] Filed: Jun. 2, 1977

[51] Int. Cl.² ............................................ G01D 15/16
[52] U.S. Cl. ................................. 346/140 A; 24/257; 29/450
[58] Field of Search ....................... 346/140 R, 140 A; 29/450; 24/129 B, 81 CC, 115 G, 257; 33/158, 27 C

[56] References Cited

U.S. PATENT DOCUMENTS

| 841,222 | 1/1907 | Bowman | 346/140 A |
| 2,608,766 | 9/1952 | Thein | 24/257 R X |
| 4,052,713 | 10/1977 | Lytle et al. | 346/140 A |

Primary Examiner—Joseph W. Hartary
Attorney, Agent, or Firm—Miller & Prestia

[57] ABSTRACT

Novel apparatus for mounting a pen to a tubular recorder pen arm includes an elongated resilient clip with two apertures formed therein that are axially alignable with each other. Fastening and positioning means, such as pronged projections, located on the clip, securely position the desired pen on the clip. The recorder pen arm is inserted through the clip apertures, upon alignment thereof against the resilient urging of the clip, so that the pen is accordingly mounted to the recorder pen arm.

8 Claims, 13 Drawing Figures

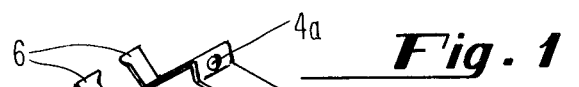
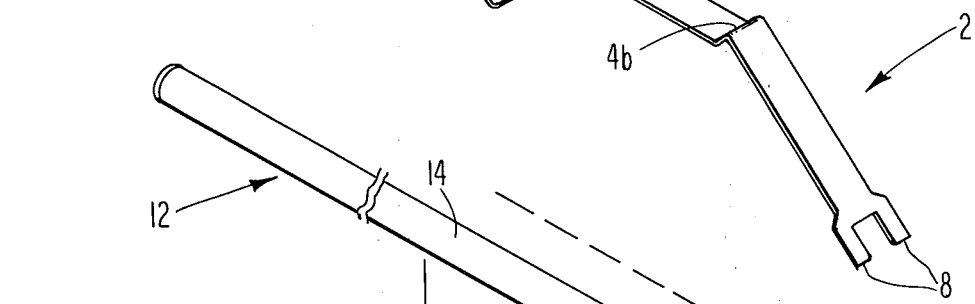
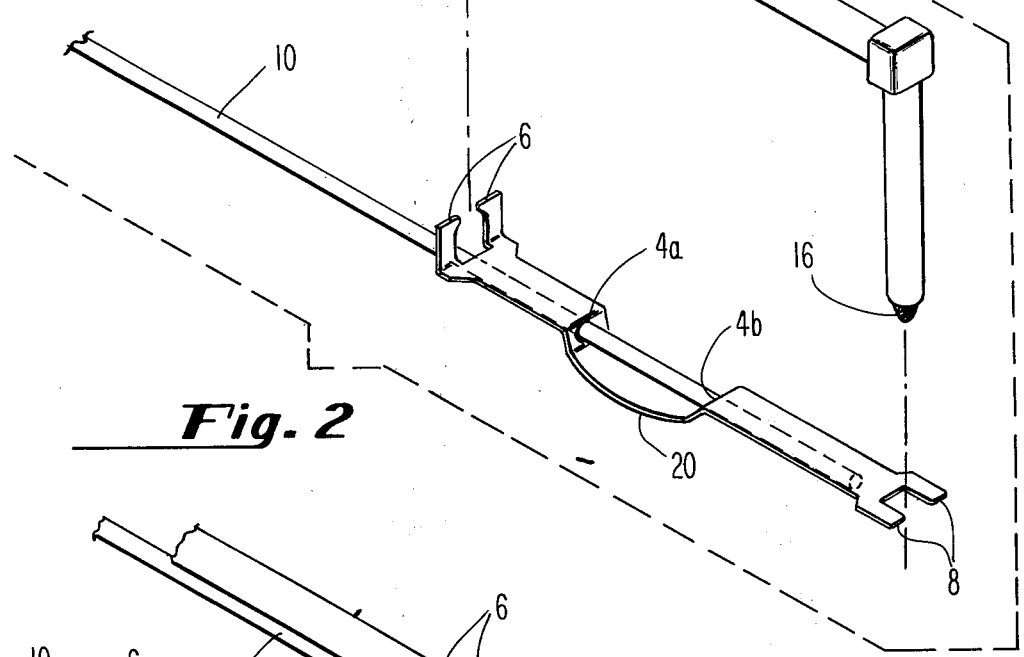
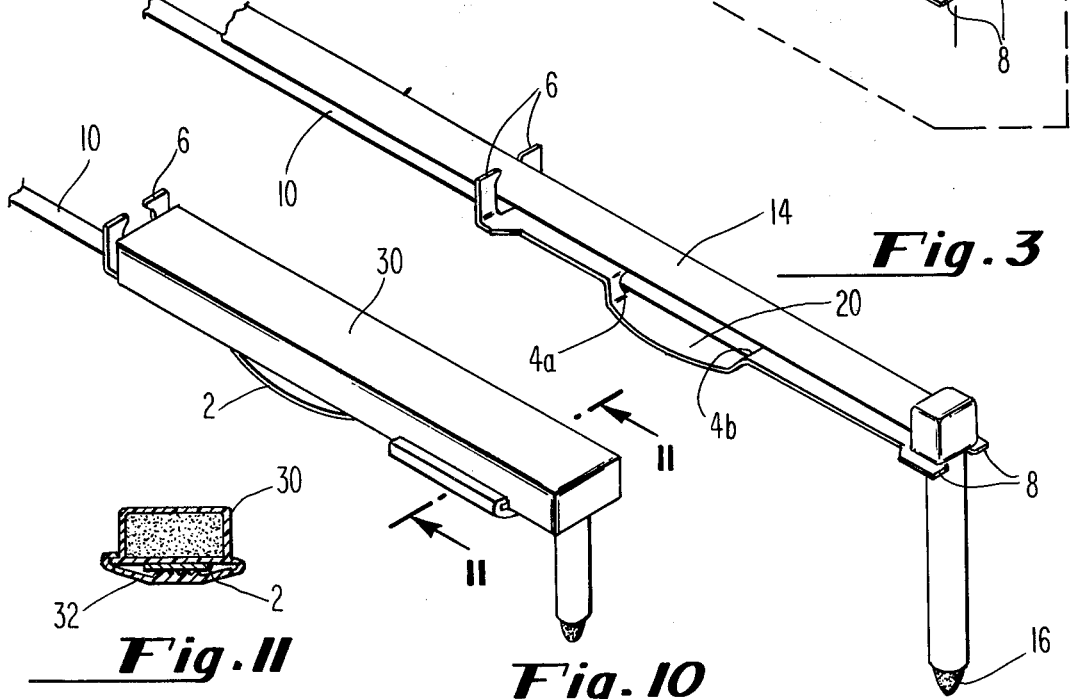

APPARATUS FOR MOUNTING A MARKER PEN TO A TUBULAR RECORDER PEN ARM

BACKGROUND OF THE INVENTION

1. Field of the Invention

This invention relates to apparatus and method for mounting a marker pen to a tubular recorder pen arm.

2. Description of Prior Art

In the recording instrument field, it is often necessary to mount a marker or pen to a recorder pen arm so that the pen may record necessary information on a movable chart or the like.

Sometimes, a plurality of pens are provided, each mounted on an individual instrument arm, whereby it is necessary that the pens be allowed to pass freely over or under one another to record several lines on the same chart.

Heretofore, several types of mounting clips have been available for attaching marking pens to flat pen arms. However, many recorders are now manufactured with tubular pen arms, and there is a great demand for apparatus and methods providing an easy mounting of marking pens to these tubular arms.

Moreover, mounting apparatus and methods that secure the pen from both axial displacement along the recorder arm length and rotational misalignment around the arm's perimeter are in great demand.

Accordingly, it is an object of the present invention to provide a method and apparatus that facilitate mounting of a marking pen to the desired tubular pen arm.

Further, it is also an object to provide a light, compact mounting member that will not interfere with pen movement and clearance when a plurality of pens are utilized on a single recorder apparatus.

It is a more specific object to provide a mounting method and apparatus that secures the pen from being axially displaced along the recorder arm length, and also prevents rotational misalignment of the pen.

SUMMARY OF THE INVENTION

These and other objects are met by the present invention. Basically, the novel mounting clip includes an elongated resilient clip member formed with at least two apertures therein. The clip is bent so that the apertures align with each other, and the recorder pen arm is inserted through the registering apertures. Due to the resilient nature of the clip, the clip exerts a frictional grip on the recorder arm since the clip is biased toward its original configuration. Fastening and positioning means located on the clip securely position the desired marker pen in place so that the pen is ready for use on the recorder arm.

According to the novel method herein disclosed, the user simply grasps the lengthwise end portions of an elongated clip member having at least two apertures formed therein, and being provided with pronged type projections at or near the terminal portions. The clip is then bent until the apertures are in registry with each other, and the tubular recorder arm is then inserted through the apertures. The marker pen is then secured to the clip, such as by positioning the pen between the prongs on each set of pronged projections.

For a better understanding of the present invention, reference should be made to the following detailed description thereof and to the accompanying drawings and subjoined claims. In the drawings, similar characters of reference indicate corresponding parts in all views.

BRIEF DESCRIPTION OF THE DRAWINGS

FIG. 1 is a perspective view of one embodiment of the present invention.

FIG. 2 is an exploded assembly view (in perspective), showing the cooperation between clip, recorder pen arm and marker pen;

FIG. 3 is a perspective view of a pen mounted on a tubular recorder arm in accordance with the invention;

FIG. 10 is a perspective view of a tubular pen arm and clip, in accordance with the present invention assembled with a different form of marker pen than is shown in the other figures; and FIG. 11 is a sectional view in the plane 11—11 of FIG. 10.

DETAILED DESCRIPTION OF THE PREFERRED EMBODIMENTS

Figure 4:
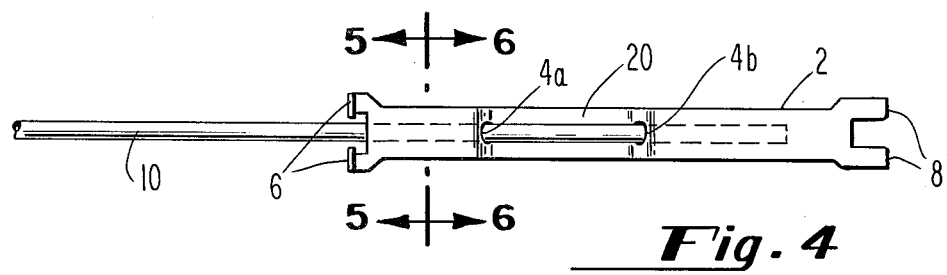
FIG. 4 is a plan view of the recorder arm and clip before the marker pen is mounted on the clip.

With reference to the drawings and especially to FIG. 1 there is shown clip 2 (shown in its natural shape) adapted to mount a marking pen to a tubular pen arm. Clip 2 is formed from a springy, resilient material, preferably sheet metal. Clip 2 is provided with apertures 4a, 4b that are axially alignable with each other upon bending clip 2.

The respective lengthwise end portions of the clip are provided with pen or marker fastening and positioning means, such as pronged projections 6, 8 that securely position a pen or marker to clip 2.

As can be clearly seen in FIG. 2, after the clip has been bent so that apertures 4a, 4b are in axial alignment, tubular recorder pen arm 10 is inserted through the apertures. The resilient nature of the clip urges the holes away from axial alignment and thus the upper and lower edges of the holes contact the top and bottom surface of the tube in a strong frictional engagement so that the clip is prevented from being axially or rotationally displaced relative to the recorder arm. In this embodiment, the clip portion intermediate apertures 4a, 4b is arcuately shaped as seen at 20. Marker pen 12 is positioned between the prong projections 6, 8 for secure mounting of pen to clip. Prongs 6 and 8 prevent lateral movement and prongs 8 prevent rotation of pen 12 relative to clip 2.

As seen in FIGS. 2 and 3, pronged projections 6 extend at an angle normal to the clip portion adjacent projections 6. Projections 8 are coplanar with the clip portion adjacent thereto.

However, it should be kept in mind that projections 6, 8 can extend from the clip body at any suitable angle, whether acute, obtuse or normal. Moreover, those skilled in the art will be able to fashion fastening and positioning means other than pronged projections 6, 8; all such equivalents fastening means are considered to be fully within the ambit of the present invention.

Pen 12 can be any type of lightweight recorder arm marker pen having a shaft 14 and nib 16 attached thereto. Two such pens are fibrous nib disposable markers, models 82-10 or 82-39, manufactured by the assignee of the present invention, Graphic Controls Corporation, Marking Systems Division, 2 Springdale Road, Cherry Hill, New Jersey 08003. These pens provide inexpensive, easily mounted, disposable recorder marking pens.

FIG. 4 is a plan view showing clip 2 and tubular recorder arm 10 in their assembled position. Recorder arm 10 extends through apertures 4a, 4b, and due to arcuate bend 20 and the resilient nature of the clip, the recorder arm is frictionally gripped.

Figure 5:
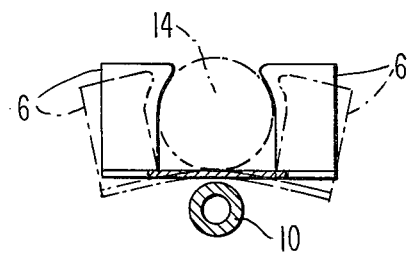
FIG. 5 is an enlarged sectional view in the plane 5—5 of FIG. 4 with the pen shown in phantom mounted on the clip.

FIG. 5 shows pronged projection set 6 extending upwardly with pen body 14 positioned between the upwardly extending prongs. Prongs 6 are readily deformable inwardly (toward the pen arm axis) and outwardly (away from the pen arm axis) to accommodate different pen diameters, to deflect slightly during pen insertion and to grasp frictionally the marker body 14.

Figure 6:
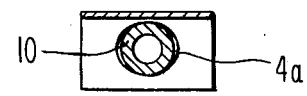
FIG. 6 is an enlarged sectional view in the plane 6—6 of FIG. 4.

FIG. 6 illustrates the snug fit of recorder pen arm 10 within aperture 4a. Note the frictional grip of the upper and lower surfaces of the pen arm in the aperture.

Figure 7A:
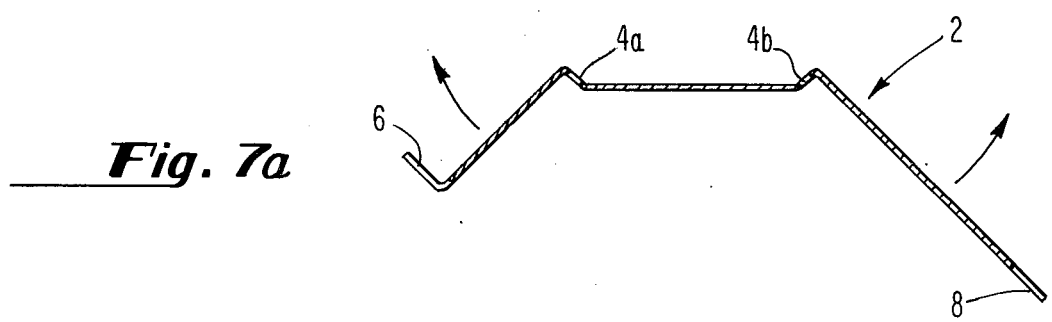
FIGS. 7a, b and c show side elevational views of the clip in sequence as the recorder pen arm is attached thereto.
Figure 7B:
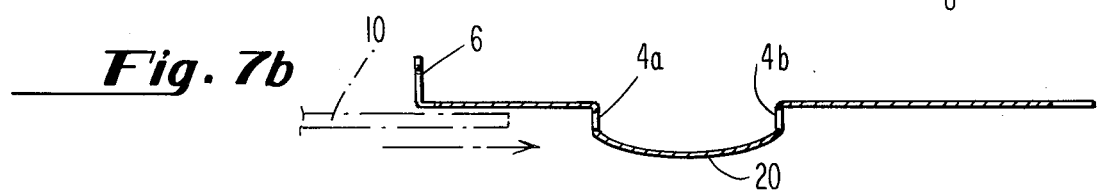
Figure 7C:
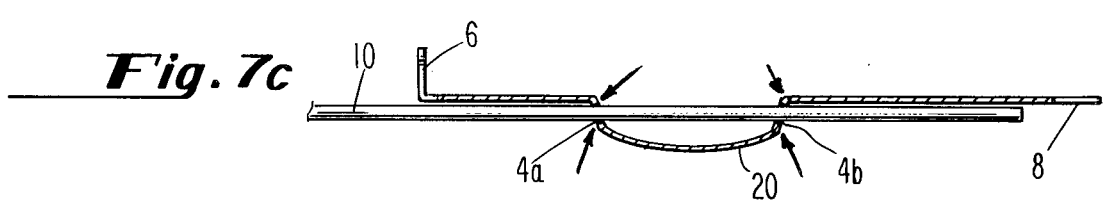

FIGS. 7a through 7c illustrate a method for mounting a pen holding to a recorder pen arm in accordance with the present invention. FIG. 7a shows clip 2 in unbent position; the apertures not in registry with each other.

After bending so that apertures 4a, 4b are axially aligned, recorder arm pen 10 is inserted through the apertures. The arrows in FIG. 7c indicate the force exerted against the recorder pen arm due to the resilient nature of the clip and the fact that clip 2 is bent from its original shape as shown in FIG. 8a.

Figure 9:
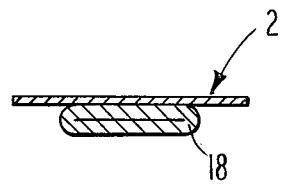
FIG. 9 is an enlarged sectional view in the plane 9—9 of the assembled arm and clip shown in FIG. 8.
Figure 8:
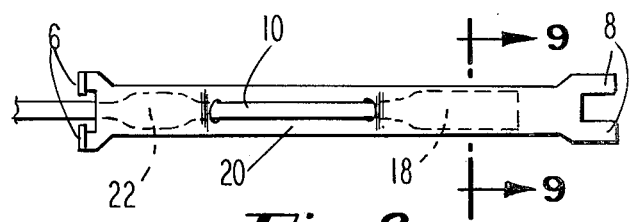
FIG. 8 is a plan view of another embodiment of the recorder arm and clip before the pen is mounted to the clip.

In a mondified embodiment of the present invention, shown in FIGS. 8 and 9, portions 18 and 22 of recorder pen arm 10 adjacent apertures 4a, 4b are flattened, to provide a more permanent method of attaching the recorder pen arm to the clip. Flattened portions 18 and 22 prevent rotation of clip 2 relative to recorder pen arm 10.

FIG. 9 shows the flattened portion 18 contacting clip 2.

In FIG. 10 is shown an assembly of the mounting clip of the present invention on a tubular pen arm in combination with a marker pen of the type disclosed and claimed in U.S. Pat. No. 3,983,569. In particular, tubular pen arm 10 with mounting clip 2 are securely fastened to a flat bottomed marker pen 30, which further includes a self-locking hinge member 32. Self-locking hinge member 32 is seen to wrap around and frictionally engage the forward flat surface of clip 2. Thus, marker pen 30, the configuration of which is generally intended for mounting on flat pen arms is readily and conveniently attached to a tubular pen arm instrument. Marker pen 30 is also positioned on clip 2, and thereby on tubular pen arm 10, by engagement of the nib section with forward pronged projections 8 and by rearward abuttment withupward pronged projections 6. In this manner, movement of the marker pen 30 relative to pen arm 10 is limited.

It will be apparent to those in the art that many forms of the pen holder clip, clip assembly and method of the present invention may be devised which differ from those illustrated and described herein but which nevertheless share the basic characteristics of the invention. For example, the holes in the pen holding clip may be square, hexagonal, ellipsoid, or any of a number of other shapes which in some instances may be preferable to the circular holes shown. All such equivalent variations are considered to be fully within the scope of the appended claims.

What is claimed is:

1. A clip for mounting a marker pen to a tubular recorder arm comprising:

(a) an elongated resilient clip member having at least two apertures formed therein, said apertures axially alignable with each other so that a tubular recorder arm may be inserted therethrough against the resilient urging of the clip; and (b) fastening and positioning means located on said clip for securing a marker pen to said clip member, said fastening and positioning means comprise at least two sets of pronged projections, displaced lengthwise along said clip, one set of projections extending at an angle from the portion of said clip adjacent thereto, the other set coplanar with the clip portion adjacent thereto.

2. A clip as recited in claim 1 wherein the first set of projections extend at an acute angle from said clip portion adjacent thereto.

3. A clip as recited in claim 1 wherein the first set of projections extend at an obtuse angle from said clip portion adjacent thereto.

4. A clip as recited in claim 1 wherein the first set of projections extend at a normal angle from said clip portion adjacent thereto.

5. A clip as recited in claim 1 wherein said clip is composed of sheet metal.

6. A clip as recited in claim 1 wherein the clip portion intermediate said apertures is arcuately shaped, when said clip is bent such that said apertures are axially aligned with each other.

7. An assembly comprising a clip for mounting a marker pen to a tubular recorder arm having an elongated resilient clip member having at least two non-axially aligned apertures formed therein, said apertures being axially alignable with each other so that a tubular recorder arm may be inserted therethrough against the resilient urging of the clip, and fastening and positioning means having at least two sets of pronged projections displaced lengthwise along said clip, one set of projections extending at an angle from the portion of said clip adjacent thereto and the other set coplanar with the clip projection adjacent thereto and a tubular recorder arm inserted through said apertures.

8. The assembly as recited in claim 7 further including flattened portions of said tubular recorder pen arm located adjacent said aligned apertures, said flattened portions adapted to prevent rotational misalignment of said clip.

* * * * *